(12) United States Patent
Bhargava et al.

(10) Patent No.: US 7,870,387 B1
(45) Date of Patent: Jan. 11, 2011

(54) PROGRAM-BASED AUTHORIZATION

(75) Inventors: Rishi Bhargava, San Jose, CA (US); E. John Sebes, Menlo Park, CA (US)

(73) Assignee: McAfee, Inc., Santa Clara, CA (US)

( * ) Notice: Subject to any disclaimer, the term of this patent is extended or adjusted under 35 U.S.C. 154(b) by 1004 days.

(21) Appl. No.: 11/400,085

(22) Filed: Apr. 7, 2006

(51) Int. Cl.
*H04L 29/06* (2006.01)

(52) U.S. Cl. .................... 713/166; 713/165; 713/167; 726/22; 726/23; 726/24; 726/25; 726/26; 726/27; 726/30

(58) Field of Classification Search ......... 713/165–167; 726/22–27, 30
See application file for complete search history.

(56) References Cited

U.S. PATENT DOCUMENTS

| | | | |
|---|---|---|---|
| 4,688,169 A | 8/1987 | Joshi ..................... 364/200 |
| 4,982,430 A | 1/1991 | Frezza et al. ................. 380/50 |
| 5,155,847 A | 10/1992 | Kirouac et al. |
| 5,222,134 A | 6/1993 | Waite et al. ................... 380/4 |
| 5,390,314 A | 2/1995 | Swanson ................... 395/500 |
| 5,521,849 A | 5/1996 | Adelson et al. ............. 364/570 |
| 5,560,008 A | 9/1996 | Johnson et al. ............ 395/650 |
| 5,699,513 A | 12/1997 | Feigen et al. .......... 395/187.01 |
| 5,778,349 A | 7/1998 | Okonogi ..................... 707/1 |
| 5,787,427 A * | 7/1998 | Benantar et al. ............... 707/9 |
| 5,842,017 A | 11/1998 | Hookway et al. ........... 395/707 |
| 5,907,709 A * | 5/1999 | Cantey et al. ............... 717/141 |
| 6,141,698 A | 10/2000 | Krishnan et al. |
| 6,192,401 B1 | 2/2001 | Modiri et al. |
| 6,275,938 B1 | 8/2001 | Bond et al. ................. 713/200 |
| 6,338,149 B1 | 1/2002 | Ciccone, Jr. et al. .......... 714/38 |
| 6,356,957 B2 | 3/2002 | Sanchez, II et al. ......... 709/328 |
| 6,393,465 B2 | 5/2002 | Leeds ........................ 709/207 |
| 6,442,686 B1 | 8/2002 | McArdle et al. ............ 713/151 |
| 6,453,468 B1 | 9/2002 | D'Souza |
| 6,587,877 B1 | 7/2003 | Douglis et al. .............. 709/224 |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman ..................... 717/126 |
| 6,832,227 B2 | 12/2004 | Seki et al. .................. 707/101 |
| 6,834,301 B1 | 12/2004 | Hanchett .................... 709/223 |
| 6,847,993 B1 | 1/2005 | Novaes et al. |
| 6,918,110 B2 | 7/2005 | Hundt et al. |

(Continued)

OTHER PUBLICATIONS

Kurt Gutzmann, "Access Control and Session Management in the HTTP Environment," Jan./Feb. 2001, pp. 26-35, IEEE Internet Computing.

(Continued)

*Primary Examiner*—Kambiz Zand
*Assistant Examiner*—Tongoc Tran
(74) *Attorney, Agent, or Firm*—Patent Capital Group

(57) ABSTRACT

Techniques which allow definition and enforcement of program-based action authorization policies. On a computer, an action or execution attempt is intercepted in real-time. The subject process, the program file of the subject process, the attempted action and the object of the attempted action are determined. An authorization policy considering the program file indicates whether the attempted action is authorized or not. In a tracking mode, the attempted action and its authorization are logged and the attempted action is allowed to proceed. In an enforcement mode, unauthorized attempts are blocked and logged, thereby enforcing the authorization policy.

13 Claims, 3 Drawing Sheets

U.S. PATENT DOCUMENTS

| | | | |
|---|---|---|---|
| 6,930,985 B1 | 8/2005 | Rathi et al. | 370/254 |
| 6,988,101 B2 | 1/2006 | Ham et al. | 707/10 |
| 6,988,124 B2 | 1/2006 | Douceur et al. | |
| 7,010,796 B1 | 3/2006 | Strom et al. | |
| 7,039,949 B2 | 5/2006 | Cartmell et al. | |
| 7,065,767 B2 | 6/2006 | Kambhammettu et al. | 719/310 |
| 7,082,456 B2 | 7/2006 | Mani-Meitav et al. | 709/203 |
| 7,093,239 B1 | 8/2006 | van der Made | |
| 7,124,409 B2 | 10/2006 | Davis et al. | |
| 7,139,916 B2 | 11/2006 | Billingsley et al. | 713/182 |
| 7,152,148 B2 | 12/2006 | Williams et al. | |
| 7,159,036 B2 | 1/2007 | Hinchliffe et al. | |
| 7,177,267 B2 | 2/2007 | Oliver et al. | 370/216 |
| 7,203,864 B2 | 4/2007 | Goin et al. | |
| 7,251,655 B2 | 7/2007 | Kaler et al. | 707/9 |
| 7,290,266 B2 * | 10/2007 | Gladstone et al. | 719/318 |
| 7,302,558 B2 | 11/2007 | Campbell et al. | 713/1 |
| 7,330,849 B2 | 2/2008 | Gerasoulis et al. | |
| 7,350,204 B2 | 3/2008 | Lambert et al. | |
| 7,353,501 B2 | 4/2008 | Tang et al. | |
| 7,363,022 B2 | 4/2008 | Whelan et al. | 455/411 |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,170 B2 | 3/2009 | Finnegan | |
| 7,603,552 B1 | 10/2009 | Sebes et al. | |
| 7,657,599 B2 | 2/2010 | Smith | |
| 7,698,744 B2 | 4/2010 | Fanton et al. | |
| 2002/0099671 A1 | 7/2002 | Mastin Crosbie et al. | 705/500 |
| 2003/0073894 A1 | 4/2003 | Chiang et al. | 600/407 |
| 2003/0074552 A1 | 4/2003 | Olkin et al. | 713/150 |
| 2003/0120601 A1 * | 6/2003 | Ouye et al. | 705/51 |
| 2003/0120811 A1 | 6/2003 | Hanson et al. | 709/245 |
| 2003/0120935 A1 | 6/2003 | Teal et al. | 713/188 |
| 2004/0003258 A1 | 1/2004 | Billingsley et al. | |
| 2004/0015554 A1 | 1/2004 | Wilson | 709/206 |
| 2004/0051736 A1 | 3/2004 | Daniell | 345/752 |
| 2004/0054928 A1 | 3/2004 | Hall | |
| 2004/0143749 A1 * | 7/2004 | Tajalli et al. | 713/200 |
| 2004/0167906 A1 | 8/2004 | Smith et al. | |
| 2004/0230963 A1 | 11/2004 | Rothman et al. | 717/168 |
| 2004/0255161 A1 | 12/2004 | Cavanaugh | 713/201 |
| 2005/0018651 A1 | 1/2005 | Yan et al. | 370/352 |
| 2005/0108562 A1 | 5/2005 | Khazan et al. | |
| 2005/0114672 A1 | 5/2005 | Duncan et al. | |
| 2005/0228990 A1 | 10/2005 | Kato et al. | 713/167 |
| 2005/0262558 A1 * | 11/2005 | Usov | 726/22 |
| 2005/0273858 A1 | 12/2005 | Zadok et al. | |
| 2006/0015501 A1 | 1/2006 | Sanamrad et al. | |
| 2006/0080656 A1 | 4/2006 | Cain et al. | |
| 2006/0137009 A1 * | 6/2006 | Chesla | 726/22 |
| 2006/0236398 A1 | 10/2006 | Trakic et al. | |
| 2007/0039049 A1 * | 2/2007 | Kupferman et al. | 726/22 |
| 2007/0083522 A1 | 4/2007 | Nord et al. | |
| 2007/0101435 A1 * | 5/2007 | Konanka et al. | 726/27 |
| 2009/0320140 A1 | 12/2009 | Sebes et al. | |

OTHER PUBLICATIONS

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," filed Feb. 16, 2005, Inventor(s): Bakul Shah et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

U.S. Appl. No. 12/640,098 entitled "Enforcing Alignment of Approved Changes and Deployed Changes in the Software Change Life-Cycle," filed Dec. 17, 2009, Inventor(s): Rahul Roy-Chowdhury, et al.

* cited by examiner

PROGRAM-BASED AUTHORIZATION

CROSS REFERENCE TO RELATED APPLICATIONS

This application is related to the following, all of which are incorporated herein by reference in their entirety:

co-pending U.S. patent application Ser. No. 10/651,591, entitled "Method And System For Containment of Networked Application Client Software By Explicit Human Input" and filed on Aug. 29, 2003;

co-pending U.S. patent application Ser. No. 10/651,588, entitled "Damage Containment By Translation" and filed on Aug. 29, 2003;

co-pending U.S. patent application Ser. No. 10/806,578, entitled "Containment Of Network Communication" and filed on Mar. 22, 2003;

co-pending U.S. patent application Ser. No. 10/739,230, entitled "Method And System For Containment Of Usage Of Language Interfaces" and filed on Dec. 17, 2003;

co-pending U.S. patent application Ser. No. 10/935,772, entitled "Solidifying the Executable Software Set of a Computer" and filed on Sep. 7, 2004;

co-pending U.S. patent application Ser. No. 11/060,683, entitled "Distribution and Installation of Solidified Software on a Computer" and filed on Feb. 16, 2005;

co-pending U.S. patent application Ser. No. 11/122,872, entitled "Piracy Prevention Using Unique Module Translation" and filed on May 4, 2005;

co-pending U.S. patent application Ser. No. 11/182,320, entitled "Classification of Software on Networked Systems" and filed on Jul. 14, 2005;

co-pending U.S. patent application Ser. No. 11/346,741, entitled "Enforcing Alignment of Approved Changes and Deployed Changes in the Software Change Life-Cycle" by Rahul Roy-Chowdhury, E. John Sebes and Jay Vaishnav, filed on Feb. 2, 2006; and co-pending U.S. patent application Ser. No. 11/277,596, entitled "Execution Environment File Inventory" by Rishi Bhargava and E. John Sebes, filed on Mar. 27, 2006.

BACKGROUND

1. Field

Invention relates generally to authorization of actions on computer systems, and in particular to authorization based on the program initiating the action.

2. Related Art

Access control is a useful and practical concept in the field of information technology. The definition, monitoring and enforcement of access control policies contribute to the predictable and manageable operation and maintenance of business assets and processes.

An abstraction central to access control is that of subjects performing actions on objects. A familiar example of this is a user (subject) attempting to delete (action) a file (object) on a computer. The usefulness of this abstraction stems from the fact that policies can be defined based on an identification of the subject and the object, as well as an authorization for the particular action attempted by the subject on the object. Once defined, such policies can be monitored and enforced, affording visibility into and control over the access and action patterns.

While actions attempted by human subjects are ultimately performed by one or more processes running on the computer, in traditional access control the authorization policies are generally defined for "human" subjects, such as users and system administrators, and tied to credentials such as logins and passwords and file ownerships. As a result, while in theory it is possible to define authorization policies based non-human subjects such as programs and processes running on a computer, today such definitions simply defer to the particular user context within which the subject program or process is executing, using that context as an input into the authorization policy instead of relying on an identification of the process or program itself.

There are a number of reasons why program-based authorization is increasingly needed today, including: a rise in the software-based automation of tasks and decisions such as system provisioning and anti-malware protection, a prevalence of exploits attempted by programs and processes running with minimal human interaction or supervision (such as software worms), the frequent practice of privilege escalation by both programs and humans attempting to gain a "privileged user" status in order to run a program with broader permissions than are allowed under the lower privilege and often resulting in malicious or accidental system breakage, and so forth.

Therefore, a need exists for techniques that allow program-based authorization, allowing authorization decisions to take into account not only the action, the object and the user context of the subject process, but also a range of other attributes of the subject process, such as the program being executed by the subject process.

SUMMARY

We disclose techniques which allow definition and enforcement of program-based action authorization policies. On a computer, an action or execution attempt is intercepted in real-time. The subject process, the program file of the subject process, the attempted action and the object of the attempted action are determined. An authorization policy considering the program file indicates whether the attempted action is authorized or not. In a tracking mode, the attempted action and its authorization are logged and the attempted action is allowed to proceed. In an enforcement mode, unauthorized attempts are blocked and logged, thereby enforcing the authorization policy.

DETAILED DESCRIPTION

In the program-based authorization techniques described herein, a process' attempt to perform an action on an object is intercepted. A program file, representing code or instructions being executed by the process, is then determined, along with the action and the object. By way of example, the interception and subsequent determinations can be performed by a software agent running on the computer. Referring to an authorization policy which considers the program file, action and object, a decision is made to either allow or block the attempted action. In both cases, it may be desirable to generate a log or alert indicative of the decision.

Figure 1:
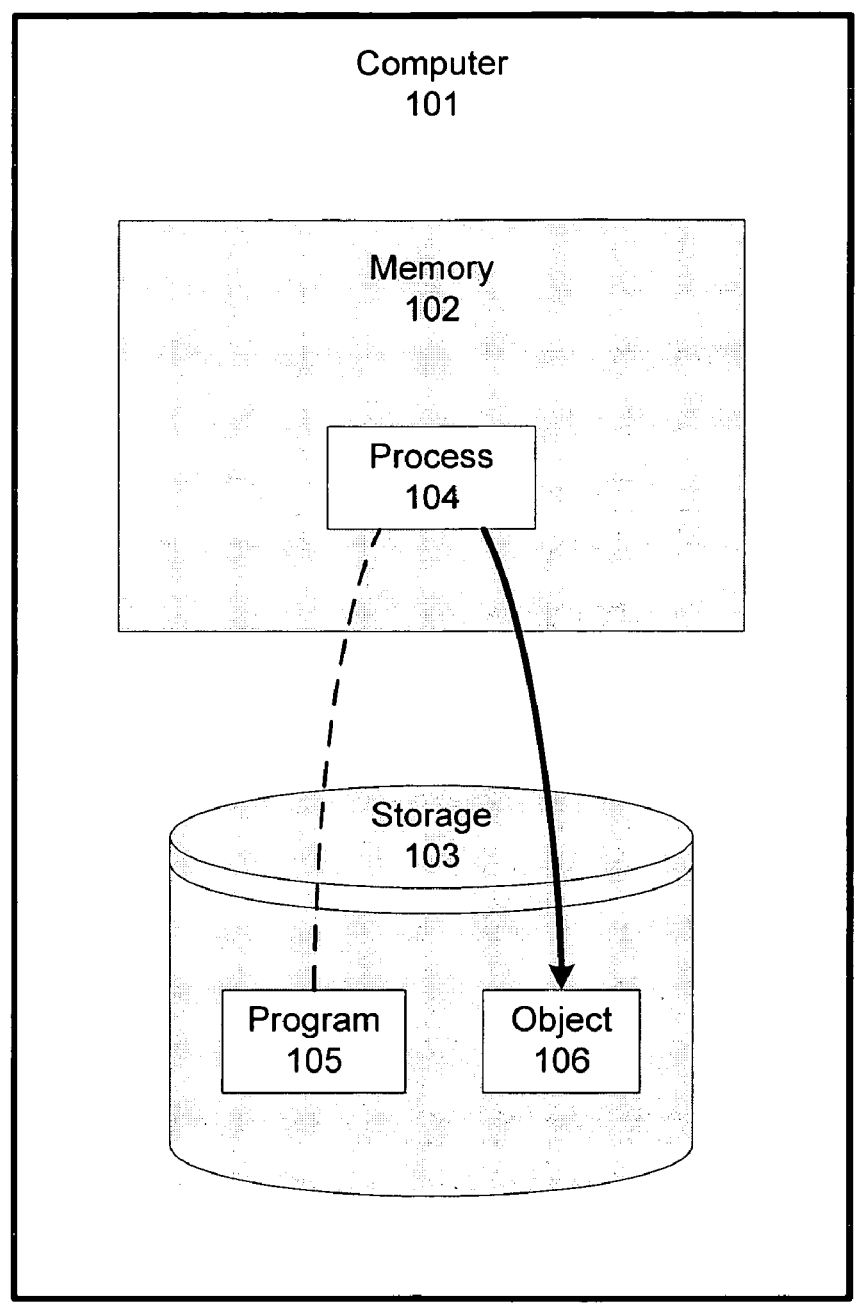
FIG. 1 is a diagrammatic illustration of an exemplary system for program-based authorization, in accordance with an embodiment of the present invention.

FIG. 1 is a diagrammatic illustration of an exemplary system for program-based authorization, in accordance with an embodiment of the present invention. Computer 101 comprises a memory component 102 and a storage component 103, managed by an operating system (OS). A process 104

(hereinafter also referred to as the "subject process") is launched and executes within memory component 102. Program file 105 (hereinafter also referred to as "subject program file") represents the code or sequence of instructions which subject process 104 starts executing upon its launch. The subject program file 105 is typically some type of an executable file, such as a binary executable file, script, batch file, interpreted code, byte code, etc. Program file 105 is stored on storage component 103 or is otherwise accessible to computer 101. Note that subject process 104, during its life, may execute other code or instructions such as dynamic libraries, scripts, accepted input, or any other container of code, but the program file 105 refers to the code that subject process 104 starts out executing upon process launch. Furthermore, as described in more detail below, when subject process 104 is launched to execute a script, the program file 105 refers to the script and not to any interpreter of the script.

At some point during its execution, subject process 104 may attempt to perform an action on an object 106. For example, object 106 may be a file and the action attempt may comprise an attempt to write to the file. Other examples of objects 106 and actions are described below.

The action attempt is intercepted, and an authorization policy is consulted. The authorization policy takes into account the subject program file 105, and optionally may also consider one or more other attributes of the subject process 104 or of the program file 105, one or more attributes of the object 106, and/or one or more attributes of the action being attempted by subject process 104. The authorization policy indicates whether the attempted action is authorized or not.

There are two broad modes of operation for the program-based authorizations of the present invention: a "tracking mode" and an "enforcement mode". Both modes allow authorized attempts to proceed, but the modes differ in how they handle unauthorized attempts. In an enforcement mode, unauthorized attempts are blocked. In a tracking mode, unauthorized attempts are allowed to proceed, but they are logged. Tracking mode is useful for examining what effects an authorization policy would have on a system were the policy to be enforced. Tracking mode allows experimentation with and fine-tuning of authorization policies on a live computer 101, as well as real-time feedback based thereon, without disturbing the operation or behavior of the computer 101. Once an authorization policy is deemed acceptable, it can be enforced by switching from tracking mode to enforcement mode.

A typical example of an object 106 is a file, managed by a file system of computer 101. In that case the action attempt is a file system action attempt such as a read, write or delete operation on the file, or it may be an attempt to execute the file. Another example of an object 106 is a registry entry, such as one managed by a Windows™ operating system. In that case the action attempt may be a retrieve, create or delete a registry entry. Other examples of objects 106 include containers or resources managed by a service-oriented architecture (SOA), data structures or other objects stored in memory 102, or any other objects that are accessible to subject process 104. In general, the actions that can be attempted by the subject process 104 depend on the object 106 and how the object is being managed. While the following description is illustrated mainly with reference to file system action attempts, this is by way of example and is not intended to limit the scope of the disclosed techniques. It should be obvious to one of ordinary skill in the art that the disclosed techniques can be applied to program-based authorization of any action attempted by a subject process on a computer. Further example actions for files and registry entries are enumerated below.

Program-Based Action Authorization

Figure 2:
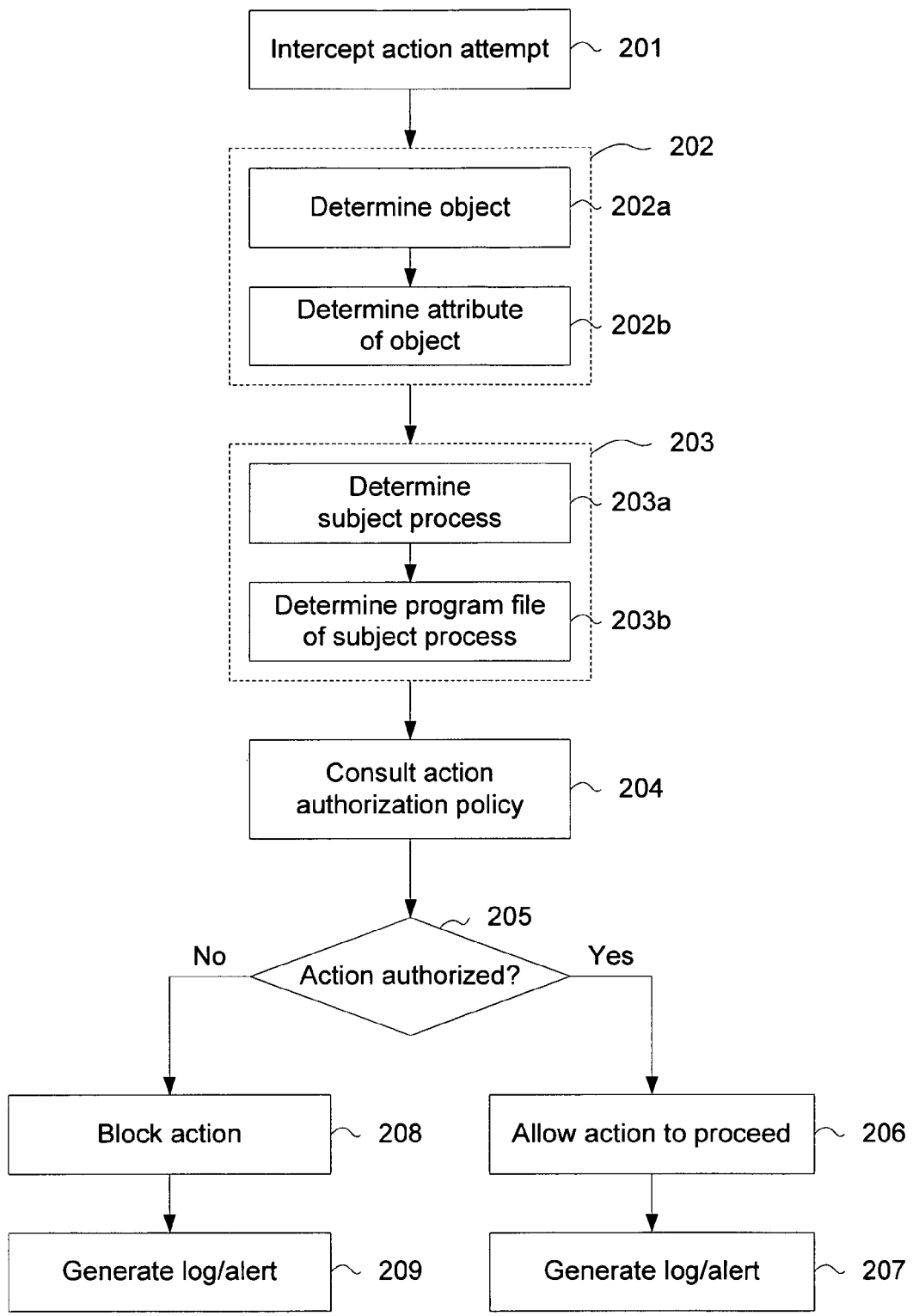
FIG. 2 is a flow diagram showing a method for program-based action authorization, according to an embodiment of the present invention.

FIG. 2 is a flow diagram showing a method for program-based action authorization, according to an embodiment of the present invention. Step 201 intercepts a file system action attempt. This step preferably occurs in real-time. Step 202 determines the target file of the file system action attempt (step 202a), which is the object 106 in this action attempt, and one or more attributes of the file object 106 (step 202b). Step 203 determines the subject process 104 that is attempting to perform the action on the file object 106 (step 203a), and the subject program file 105 that represents the code being executed by the subject process 104 (step 203b). Optionally, step 203b also determines one or more other attributes of the subject process 104 and/or the subject program file 105. Examples of such other attributes are enumerated below.

Step 204 consults an authorization policy to determine 205 whether the attempted action is authorized or not. The authorization policy takes into account the subject program file 105 of the subject process 104, and may optionally also consider any other attributes that were determined in step 203b. The authorization policy preferably also takes into account the attempted action and one or more attributes of the file object 106 determined in step 202b (example attributes are described below). Optionally, the authorization policy may disregard some of the supplied information. For example, the authorization policy may disregard some or all of the file object 106 attributes and consider only the attempted action and subject program file 105 of the subject process 104. Authorization policies may be stored using any appropriate data structure, for example in a computer readable medium comprising a matrix with a plurality of entries, with an entry associating a program file (subject) with one or more allowed actions and objects on the computer.

If the action is authorized, step 206 allows the action to proceed and optional step 207 generates one or more log entries and/or alerts indicating that the authorized action was allowed to proceed. If the action is not authorized, step 208 blocks the action from proceeding and optional step 209 generates one or more log entries and/or alerts indicating that the unauthorized action was blocked. A log entry or alert may include information about the subject process, subject program, action, object, relevant authorization policy, date and time, and/or any other information available at the time of logging. Steps 208 and 209 are for an enforcement mode embodiment of the present invention. In a tracking mode embodiment, as described above, step 208 is skipped, allowing the unauthorized action to proceed and recording logs and/or alerts at step 209.

By way of example, and not limitation, attributes of the subject process 104, action and object 106 may include the following:

Subject process 104:
  the program file 105 of subject process 104. This can be a
    binary file, script file, batch file, byte code, or any other
    local or remote container comprising compiled code,
    interpreted code, or any other code or instructions for
    execution on the computer 101;
  one or more attributes of the program file 105 (analogous to
    the attributes enumerated below for objects 106). Note
    that for simplicity of exposition and naming, we are
    considering attributes of the program file 105 as
    attributes of the subject process 104, since we are considering the subject program file 105 itself as an attribute
    of the subject process 104;
  in cases where the subject process 104 executes code other
    than the program file 105 (as described above), such
    other pieces of code may represent further attributes of
    the subject process 104;
  a unique process identifier assigned by the OS to subject
    process 104, such as a process identification number, an
    EPROCESS block identifier, or other data structure or
    token associated with subject process 104;

the computer on which the subject process 104 is executing;

the user or group context within which the subject process 104 is executing;

any other data or meta-data that the OS associates with the subject process 104, or that another party associates with the subject process 104 (for example when the action is a "delete database" operation on a database object 106 managed by a database management system (DBMS) that associates one or more permissions or attributes with the subject process 104 or the subject program 105);

Action:

whether the action is a file system action request, a registry action request, or a request to perform an action on an object 106 managed by another subsystem of the computer 101;

action type, for example whether the action is an attempt to read from an object 106, write to an object 106, append to an object 106, truncate an object 106, create an object 106, delete an object 106, rename an object 106, move an object 106, get or set one or more attributes of the object 106, etc.;

the date or time at which the action is being attempted;

any other data or meta-data that the OS associates with the action, or that another party associates with the action (for example when the action is a "delete database" operation on a database object 106 managed by a DBMS that associates one or more permissions or attributes with such action);

Object 106:

object 106 name, path of the object 106 (for example when object 106 is a file or other data structure managed by the OS file system), object 106 size, object 106 permissions, object 106 ownerships (group owner, user owner), etc.;

fully qualified name of the object 106 (for example when the object 106 is a registry entry);

any other data or meta-data that the OS associates with the object 106, or that another party associates with the object 106 (for example when the object 106 is a database object managed by a DBMS);

when the action attempts to alter the contents of the object 106, a set of one or more differences (i.e. one or more "cliffs") between one or more parts of the object 106 contents before the attempted change and one or more parts of the object's 106 likely contents after the attempted change;

note that an attribute may be considered in at least two ways: as what the attribute is at the time of consideration, i.e. before the attempted action takes effect, and as what the attribute likely will be as a result of completion of the attempted action. For example, authorization of an attempted permission change action may consider the current permissions of the object 106 and/or the permissions as they would be as a result of the attempted permission change action.

We now turn to describing the steps of FIG. 2 in more detail. For the interception step 201, OS provisions can be used to intercept file system action requests and registry action requests, as well as to determine whether a file system action request is a an attempt to read a file, write to a file, delete a file, rename a file, move a file, append a file, truncate a file, get or set permissions on a file, or get or set any other attribute of a file. For example, in a Microsoft Windows™ OS environment, a filter driver can be used to intercept file system requests and determine their type.

In other operating systems, such as Linux or other Unix-derived operating systems, a "shim" module or wrapper mechanism can be used for that purpose. A wrapper mechanism would redirect action attempts (e.g. system calls) to a wrapper library that represents an entry point for the interception code, and which may eventually call into the original library or code that implements the intended action attempt. One way of indicating redirection to the wrapper library comprises setting one or more environment variables indicating library load paths and sequences.

A shim module redirects system calls to custom interception code within the kernel, and the interception code decides whether or not to redirect execution to the kernel code that implements the system call. For example, in a Unix-derived OS, one or more virtual file system (VFS) methods may be patched to facilitate redirection to interception code. These and other Techniques for the interception of file system requests should be obvious to one of ordinary skill in the art, and are also briefly described in the above referenced co-pending U.S. patent application Ser. No. 11/346,741. Similarly, OS provisions can be used to intercept registry action requests and determine whether the request is an attempt to read or retrieve an entry, delete an entry, write to an entry, create an entry, or perform any other actions on the entry. We continue to illustrate the steps with exemplary references to file system requests.

Once a file system request is intercepted, the request indicates the file object 106 as well as the action that the subject process 104 is attempting to perform on the file object 106. It then remains to determine the subject process 104 that initiated the file system request (step 203*a*). One technique for doing this is to start with a unique identifier for the process context of the currently executing subject process 104. This identifier need not necessarily comprise the traditional process identification number (PID) assigned to processes by many operating systems, though it may. For example, in a Microsoft Windows™ OS, an EPROCESS block or a process handle can be used to uniquely identify the subject process 104.

Once an identifier for the subject process 104 is determined, it remains to infer the subject program file 105, and optionally one or more other attributes, of the subject process 104 (step 203*b*). For some operating systems, such as a Microsoft Windows™ OS, this information may not be available via a published application programming interface (API). In such cases, one technique for inferring the subject program file 105 associated with the subject process 104 is to explicitly keep track of the process-program associations so that they can be referred to when needed. One way to do this is by implementing a "Process Tracking Framework" abstraction which, upon receiving an identifier of a subject process 104 context, indicates the subject program file 105 associated with the subject process 104. The Process Tracking Framework is described separately below.

The authorization rules can be arbitrarily complex and may represent any function or Boolean predicate which effectively takes as input a subject program file 105 of a subject process 104 (and optionally one or more further attributes of the subject process 104), the requested action, and an object 106 (or one or more file object 106 attributes), and outputs an authorization decision. We will now present some specific use cases enabled by the program-based authorization techniques and authorization policies described herein.

One particular example of using program-based action authorization is to implement file read restrictions on a computer. As one example of a read restriction policy, a set of authorization rules can be defined to only allow a specified set of files R to be read by authorized subject processes 104. For example, we may only allow a specific program file 105 P to read any file in the set R. Consequently, whenever a process is created for the execution of some program, the enforcement mode program-based authorization mechanism described herein only allows a file in R to be read by that process when the process represents the execution of program P.

As a concrete example, if P is a specific word processor such as Microsoft Word™ and R is defined as files whose names have the extension of ".doc" or ".rtf" or ".txt", then no program other than Microsoft Word™ is authorized to read such files. In particular, this means that file transfer programs and file copy utilities will not be able read such files and are thereby prevented from exfiltrating or duplicating such files (unless, of course, those programs are explicitly authorized to do so by the authorization policy or we are operating in tracking mode).

The authorization rules can be extended or amended to allow useful exceptions. For example, the set of programs authorized to read R may be extended to include further word processing programs. As another example, the authorization policies may be amended to authorize one or more backup and restore programs, whose purpose it is to read files for the purpose of archiving them, to read files in R.

Another example of using program-based action authorization is to implement file write restrictions on a computer. As one example of a write restriction policy, a set of authorization rules can be defined to allow a given program to only write to a specified set of files W. For example, we may specify that a specific program P may only write to files in W. Consequently, given a process created for the execution of some program, the enforcement mode program-based authorization mechanism described herein only allows the process to write to files in W when the process represents the execution of the program P.

As a concrete example, if P is a specific hypertext markup language (HTML) browser such as Microsoft Internet Explorer™, and W is defined as files whose names have the extension of ".html" or ".htm", then Microsoft Internet Explorer™ will be allowed to only write to ".html" and ".htm" files. In particular, Microsoft Internet Explorer™ will be blocked from writing any executable files, scripts, batch files, dynamic libraries, etc. to disk, thereby reducing the risk of browser-written malware.

Other examples of grouping objects for the purpose of defining authorization policies are grouping objects by ownership, grouping objects that were created in a given time window, or grouping objects by their position in an object hierarchy. Corresponding example authorization policies here include: allowing only a predefined set of programs to modify files which (a) are owned by a specified owner; (b) were originally created before a threshold date; or (c) reside in a given directory within the file system.

Other examples of using program-based action authorization comprise extending the concepts disclosed in above-referenced co-pending U.S. Patent Applications with the program-based authorization techniques disclosed herein. In particular U.S. patent application Ser. Nos. 11/346,741 and 11/277,596 describe techniques involving authorization of updates and changes to and execution of objects resident on a computer system (such as software and configuration files, registry entries, executables, etc.). The present program-based authorization techniques extend the authorization of updates and changes and executions described in said patents to also take into account one or more attributes of the subject process (and, by extension, of the subject program) attempting the action.

Program-Based Execution Authorization

The process for execution authorization is similar to that for action authorization, except that in some operating systems execution requests may follow a different code path that other file system action requests, and therefore the interception of execution requests may differ in implementation from the interception of other file system action requests.

Figure 3:
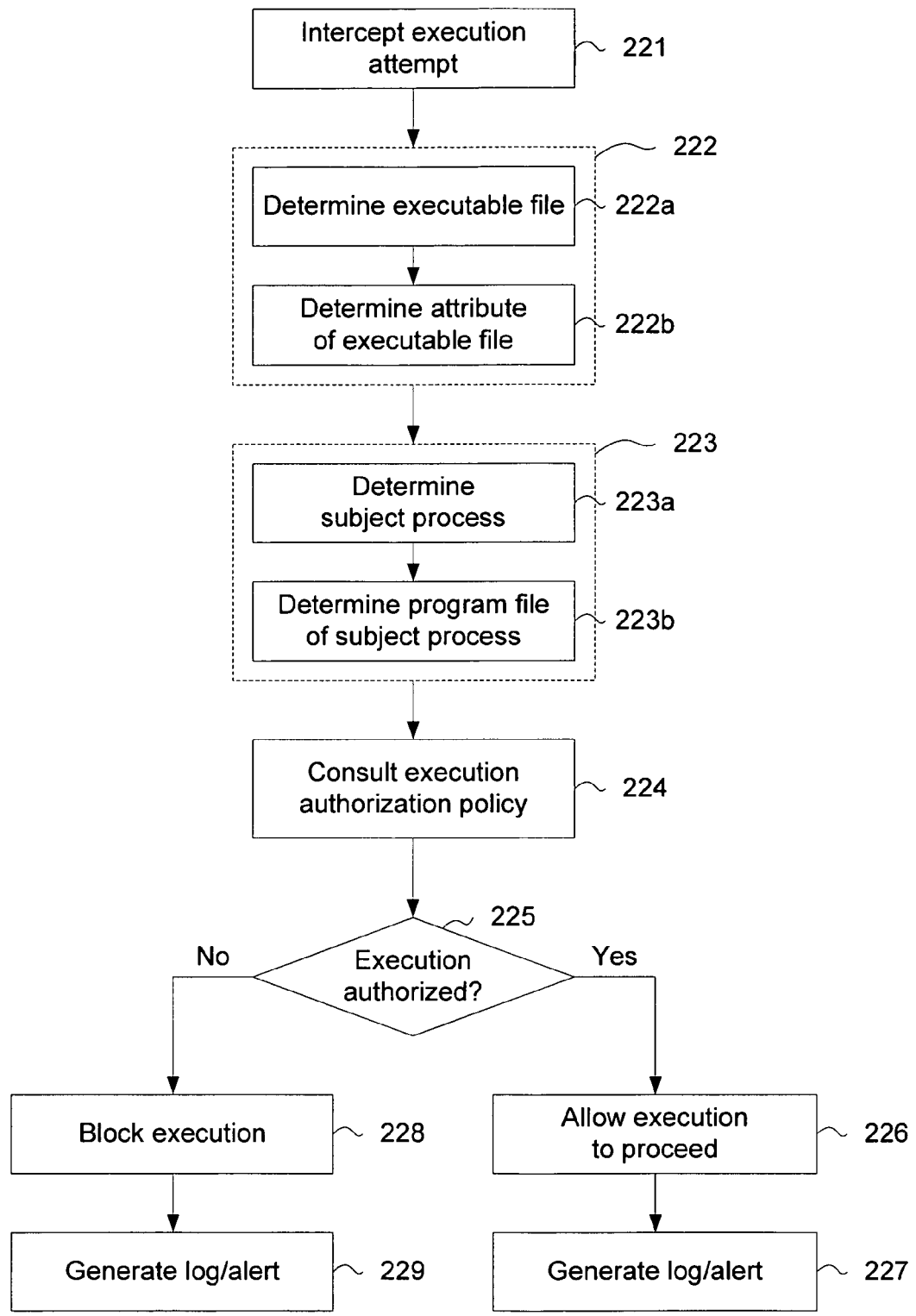
FIG. 3 is a flow diagram showing a method for program-based execution authorization, according to an embodiment of the present invention.

FIG. 3 is a flow diagram showing a method for program-based execution authorization, according to an embodiment of the present invention. Step 221 intercepts an execution attempt. This step preferably occurs in real-time. Step 222 determines the executable file (step 222*a*), which is the object 106 in this execution attempt, and one or more attributes of the executable file object 106 (step 222*b*). Step 223 determines the subject process 104 that is attempting to perform the execute action on the executable file object 106 (step 223*a*), and the subject program file 105 that represents the code being executed by the subject process 104 (step 223*b*). Optionally, step 223*b* also determines one or more other attributes of the subject process 104 along with the subject program file 105. Examples of such other attributes were enumerated above.

Step 224 consults an execution authorization policy to determine 225 whether the attempted execution is authorized or not. The authorization takes into account the subject program file 105 of the subject process 104, and may optionally also consider any other attributes of the subject process 104 that were determined in step 223*b*. The authorization policy preferably also takes into account one or more attributes of the executable file object 106 determined in step 222*b* (example attributes were described above). Optionally, the authorization policy may disregard some of the supplied information. For example, the authorization policy may disregard the attributes of the executable file object 106 and consider only the subject program file 105 of the subject process 104.

If the execution is authorized, step 226 allows the execution to proceed and optional step 227 generates one or more log entries and/or alerts indicating that the authorized execution was allowed to proceed. If the execution is not authorized, step 228 blocks the action from proceeding and optional step 229 generates one or more log entries and/or alerts indicating that an unauthorized execution was blocked. Analogous to the above description, steps 228 and 229 are for an enforcement mode embodiment of the present invention. In a tracking mode embodiment, step 228 is skipped, allowing the unauthorized execution to proceed and recoding logs and/or alerts at step 229.

We now turn to describing the steps of FIG. 3 in more detail. One technique for implementing the interception step 221 comprises placing hooks within the process creation and process termination code paths of the OS. Since an execution request submitted to the OS generally includes an indication of the executable file object 106 as an argument (e.g. name or handle of a binary file, script file, batch file, interpreted program file, byte code file, etc.), what remains is to determine the subject process 104 and its subject program file 105, and optionally one or more other determined attributes (step 223). Determination of the subject process (step 223*a*) can be done as described above, for example by starting with a unique identifier for the process context of the currently executing subject process 104. Determination of subject process 104 attributes (step 223*b*), such as the actual program file comprising the code for the subject process, can be done by using the Process Tracking Framework.

Process Tracking Framework

By way of example, and not limitation, we now describe an exemplary implementation of the Process Tracking Framework. When the OS boots up, hooks are placed in the process creation and process termination code paths. As processes are created, one or more data structures are maintained which keep track of associations between processes (identified by a unique identifier) and programs (i.e. executable files, such as binaries, scripts, batch files, interpreted code, etc.), wherein a program associated with a process represents the code that the process started out executing when the process was launched. Conversely, as processes terminate, their corresponding entries are removed from the Process Tracking Framework data structures in order to keep the structures up-to-date and properly maintained.

Before turning to example implementations of the Process Tracking Framework, we clarify what is meant by the program 105 associated with a subject process 104 in cases where the process is launched to execute non-native code, such as a script, that requires an interpreter program for its execution. In such cases, for our purposes of program-based authorization, we associate the launched process (subject process 104) with the script (subject program 105), not with the program representing the interpreter of the script. This is true in general for programs that are read in by another program for execution, such as scripts, interpreted code, byte code, etc. For example, when a PERL script is executed, we associate the launched subject process 104 with the script file, not with the PERL interpreter program launched to interpret the script, even though the interpreter program is actually what the subject process starts out executing. Throughout the present description, this is what is meant by the subject program 105 associated with a subject process 104, with the Process Tracking Framework maintaining the appropriate association.

We now turn to an example implementation of the Process Tracking Framework. On a Microsoft Windows™ OS, a request to create a new process may involve calling a user-mode process creation function with an indication of the desired executable file as an argument. This function in turn may (a) call a function in kernel-mode to open the executable file and get a file handle for it, (b) call a function in kernel-mode to create a new section, passing in the file handle and receiving a new section handle, and (c) call a kernel-mode process creation function, passing in the section handle and a handle for the subject process (parent process) and receiving back a handle for the new process that is being created (child process).

Step (b) provides a correspondence between the section handle and the file handle, and we can obtain the file name from the file handle. Hence we can keep track of the correspondence between section handles and executable file names in the Process Tracking Framework data structures. Step (c) provides a correspondence between the section handle and the child process handle, and we can obtain the child process context from the child process handle. Hence we can also keep track of the correspondence between process contexts and section handles in the Process Tracking Framework data structures. Combining the two correspondences, the Process Tracking Framework allows us to obtain executable file names from process contexts. Similar techniques can be used to create and maintain a Process Tracking Framework on other operating systems such as Linux™, Solaris™, HP-UX™, AIX™, other Unix-flavored operating systems, etc. For example, in a Unix-derived OS, exec( ) and exit( ) calls (or variations thereof) may be patched, for example by patching the appropriate system call tables, in order to provide entry points for the creation, maintenance and cleanup of the Process Tracking Framework data structures associating processes with one or more attributes as described above.

Optionally, the Process Tracking Framework may also fulfill the task of providing one or more attributes for the subject process 104 and/or of the executable file object 106, in order to make the abstraction more convenient for the components that use the Process Tracking Framework. But this is an implementation choice, and such tasks may just as well be performed by the components themselves or by any other pieces of code.

Optionally, should deeper visibility into the execution chain be of interest, the history of process creation and termination can be tracked in order to establish and maintain up-to-date process creation trees. This enables the definition, implementation and enforcement of dynamic authorization policies. For example, we may define an authorization policy according to which a newly created executable file (such as a newly created binary executable file) can only be executed by its creator process. This means that when a subject process 104 attempts to execute an executable file object 106, the authorization policy allows the execution only when the subject process 104 is the creator of the executable file object 106. This concept can be extended to consider the program file 105 (of the creator process) as the creator of the executable file object 106, instead of limiting the creator concept to the specific instance of the creator process. In this extended case, the authorization policy allows a subject process 104 to execute an executable file object 106 whenever the subject program file 105 of the subject process 106 is considered the creator of the executable file object 106. The benefit is that this manner of authorization survives the termination of the specific creator process in a meaningful and useful way.

In another example of using the concept of a program file 105 P being considered the creator of an executable file object 106, the program file 105 P may be run in "learning mode" for a period of time. During the learning period, we allow the action and execution attempts by P (i.e. by any subject processes 104 executing the code in P) to proceed without blocking. The intent is to consider such actions and executions as normal activities of P which ought to be considered authorized in the future. At the end of the learning period one or more authorization policies are generated for program P, authorizing the actions and executions observed during the learning period. The authorizations may be subsequently tweaked, narrowed or broadened, in accordance with relevant business or operational concerns. Note that during the learning period P should preferably be configured to run in a manner that excludes unintended or unsafe or unwanted behaviors (as much as possible and practical), since otherwise the generated authorization policy will authorize such unwanted behavior. For example, P should preferably not be allowed to run scripts or macros of unknown authorship or to be operated or accessed by untrusted parties.

The disclosed program-based authorization techniques generalize to any other objects and actions which are accessible to running processes. Examples of such other objects include: synchronization objects such as semaphores and locks; inter-process communication (IPC) objects such as shared memory segments; communication objects such as network sockets; local communication abstractions such as pipes; file access objects such as symbolic links (on a Unix-flavored OS) and shortcuts (on a Windows™ OS); running processes; etc. Actions applicable to such objects depend on the specific abstractions, implementations and semantics of the systems managing the objects, with examples including: killing, suspending, unsuspending or sending signals to processes; acquiring or releasing locks; reading from or writing to shared memory segments; opening, reading from, writing to, or closing network sockets or pipes; etc. The adaptation of the program-based authorization steps disclosed herein to such objects and actions (such as interception of action attempts, determination of object attributes, etc.) should be obvious to one of ordinary skill in the art.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for authorizing file system actions on a computer, comprising:
   intercepting a file system action attempt indicating an action by a process on a file;
   determining a program file representing code being executed by the process;
   allowing the action to proceed when it is authorized, as indicated by an authorization policy, wherein a first log is generated for the action, and wherein a first set of attributes is identified as being associated with the action, the first set of attributes including an action type, a request type, a date and a time at which the action is being attempted, and a set of differences between one or more parts of content of an object sought to be altered by the action, and wherein the differences identify changes between the content before and after the action; and
   blocking the action when it is not authorized and when a first mode is being used, and wherein a second mode is configured to allow the action when it is not authorized according to the authorization policy and a second log is subsequently generated to identify the unauthorized action as having occurred;
   wherein the authorization policy indicates whether the process is authorized to perform the action on the file.

2. A method as recited in claim 1, wherein the determining step further determines one or more attributes of the processor of the program file.

3. A method as recited in claim 1, wherein the action indicates a read operation on the file.

4. A method as recited in claim 1, wherein the action indicates a write, append or truncate operation on the file.

5. A method as recited in claim 1, wherein the action indicates a delete, move or rename operation on the file.

6. A method for authorizing registry actions on a computer, comprising:
   intercepting a registry action attempt indicating an action by a process on a registry entry;
   determining a program file representing code being executed by the process;
   allowing the action to proceed when it is authorized, as indicated by an authorization policy, wherein a first log is generated for the action, and wherein a first set of attributes is identified as being associated with the action, the first set of attributes including an action type, a request type, a date and a time at which the action is being attempted, and a set of differences between one or more parts of content of an object sought to be altered by the action, and wherein the differences identify changes between the content before and after the action; and
   blocking the action when it is not authorized according to the authorization policy and when a first mode is being used, and wherein a second mode is configured to allow the action when it is not authorized and a second log is subsequently generated to identify the unauthorized action as having occurred;
   wherein the authorization policy indicates whether the process is authorized to perform the action on the registry entry.

7. A method as recited in claim 6, wherein the determining step further determines one or more attributes of the process or of the program file.

8. A method as recited in claim 6, wherein the action indicates a read, retrieve, write, create or delete operation on the registry entry.

9. A method for authorizing executions on a computer, comprising:
   intercepting an execution attempt indicating a process attempting to execute an executable file;
   determining a program file representing code being executed by the process;
   allowing the execution to proceed when it is authorized, as indicated by an authorization policy, wherein a first log is generated for the action, and wherein a first set of attributes is identified as being associated with the action, the first set of attributes including an action type, a request type, a date and a time at which the action is being attempted, and a set of differences between one or more parts of content of an object sought to be altered by the action, and wherein the differences identify changes between the content before and after the action; and
   blocking the execution when it is not authorized according to the authorization policy and when a first mode is being used, and wherein a second mode is configured to allow the action when it is not authorized and a second log is subsequently generated to identify the unauthorized action as having occurred;
   wherein the authorization policy indicates whether the process is authorized to execute the executable file.

10. A method as recited in claim 9, wherein the determining step further determines one or more attributes of the process or of the program file.

11. A method as recited in claim 9, wherein the authorization policy authorizes the execution when the executable file was created by the process.

12. A method as recited in claim 9, wherein the authorization policy authorizes the execution when the executable file was created by any process executing the program file.

13. A method as recited in claim 9, wherein the authorization policy authorizes the execution when the executable file was created by the process or by an ancestor process of the process.

* * * * *